United States Patent [19]

Ward

[11] Patent Number: 5,777,751
[45] Date of Patent: Jul. 7, 1998

[54] CORRECTION OF CURVED SCAN LINES IN AN OPTICAL SCANNING SYSTEM

[75] Inventor: Joseph Ward, Hilton, N.Y.

[73] Assignee: Eastman Kodak Company, Rochester, N.Y.

[21] Appl. No.: 667,264

[22] Filed: Jun. 20, 1996

[51] Int. Cl.$^6$ .............................. H04N 1/40; H04N 1/29; G06K 9/36; G01D 9/42
[52] U.S. Cl. .................... 358/298; 358/300; 358/481; 382/293; 347/225; 347/247
[58] Field of Search ........................ 358/296, 298, 358/300, 406, 448, 456, 471, 474, 480–483, 493, 494; 250/208.1; 355/47, 52; 382/254, 276, 289, 293, 312, 319, 321; 347/129, 131, 134, 224, 225, 237, 247

[56] References Cited

U.S. PATENT DOCUMENTS

| | | | |
|---|---|---|---|
| 4,551,752 | 11/1985 | Wall et al. | 358/113 |
| 4,759,593 | 7/1988 | Kessler | 350/6.8 |
| 4,843,481 | 6/1989 | Plummer | 358/296 |
| 4,987,496 | 1/1991 | Greivenkamp, Jr. | 358/448 |
| 4,991,977 | 2/1991 | Manns et al. | 382/321 |
| 5,221,975 | 6/1993 | Kessler | 358/474 |
| 5,276,530 | 1/1994 | Siegel | 358/406 |
| 5,333,067 | 7/1994 | Chung | 358/474 |
| 5,497,236 | 3/1996 | Wolff et al. | 358/296 |
| 5,608,538 | 3/1997 | Edgar et al. | 358/406 |

OTHER PUBLICATIONS

"Laser Scanning for Electronic Printing", Proceedings of the IEEE, 597 (Jun., 1982).

*Primary Examiner*—Eric Frahm
*Attorney, Agent, or Firm*—Nelson Adrian Blish; Milton S. Sales

[57] ABSTRACT

An output writer includes an output scanner and optics that creates printed pixels along curved scan paths. Provided that a source of input image pixel value data presents data with pixels to be positioned in a rectangular coordinate system with a constant distance in an x-direction between adjacent input pixels, a position is determined along the curved scan paths of a pixel to be printed. The difference between the position of the pixel to be printed and the positions in the rectangular coordinate system of associated input pixels is determined, and then a value for the pixel to be printed is determined as a function of (1) the value data of the associated input pixels and of (2) the determined difference between the position of the pixel to be printed and the positions of the associated input pixels. If an input reader includes an input scanner and optics that creates curved scan paths to produce a stream of input pixel values along the curved scan paths for conversion to a stream of output pixel values in a rectangular coordinate system with a constant distance in an x-direction between adjacent output pixels, a position in the rectangular coordinate system of an output pixel is determined, as is the difference between the position of the output pixel and the positions on the curved scan paths of associated input pixels. A value for the output pixel is then determined as a function of (1) the value of the associated input pixels and of (2) the determined difference between the position of the output pixel and the positions of the associated input pixels.

23 Claims, 5 Drawing Sheets

CORRECTION OF CURVED SCAN LINES IN AN OPTICAL SCANNING SYSTEM

BACKGROUND OF THE INVENTION

1. Technical Field

This invention relates generally to optical scanning systems which convert curved scan lines to a straight line raster, and vice versa.

2. Background Art

The optical system of scanning systems such as laser scanners and printers can be greatly simplified and reduced in cost if spherical, rather than cylindrical optical elements can be used. Such an optical system is described in U.S. Pat. No. 4,759,593 which issued to David Kessler on Jul. 26, 1988. A characteristic of such an optical system is that the path traversed by the laser on the media does not follow a conventional raster of straight scan lines. Instead, this system produces "curved" scan lines, or scan arcs on the media.

It is true that essentially all digital images are sampled on a conventional straight line raster, or in other words on a rectangular coordinate system. Thus, in order to "print" using the simplified optical system mentioned above, an input digital image must be processed to account for the curved output scan lines. Similarly, in a scanning system which creates a digital image from a print or negative, the curved input scan lines must be accounted for to produce an output digital image whose pixels are on a rectangular coordinate system.

U.S. Pat. No. 4,843,481, which issued to William Plummer on Jun. 27, 1989, describes an apparatus for capturing an image, which is to be subsequently printed with a rotary-head printer, wherein the capture process uses a special CCD array wherein the sensor elements are placed on arcs to exactly coincide with the arcs used by rotary-head-printer.

Many references on image resampling or interpolation exist. One reference is *Digital Image Warping*, George Wolberg, IEEE Computer Society Press, 1990.

DISCLOSURE OF THE INVENTION

It is an object of the present invention to provide a process which "resamples" a digital image to determine the pixel values of a new digital image in order to correct for the pixel positions inherent to an efficient optical system which uses curved scan lines.

It is another object of the present invention to eliminate the need for a special capture device, such as disclosed in the Plummer patent, by utilizing a digital image resampling process to determine a new digital image suitable for printing with curved scan lines. Thus, any digital image that has been sampled on a conventional raster can be printed on our simplified printer with curved scan lines, by using this algorithm.

According to these and other objects, an output writer according to a feature of the present invention includes an output scanner and optics that creates printed pixels along curved scan paths. Provided that a source of input image pixel value data presents data with pixels to be positioned in a rectangular coordinate system with a constant distance in an x-direction between adjacent input pixels, a position is determined along the curved scan paths of a pixel to be printed. The difference between the position of the pixel to be printed and the positions in the rectangular coordinate system of associated input pixels is determined, and then a value for the pixel to be printed is determined as a function of (1) the value data of the associated input pixels and of (2) the determined difference between the position of the pixel to be printed and the positions of the associated input pixels.

According to another feature of the present invention, an input reader includes an input scanner and optics that creates curved scan paths to produce a stream of input pixel values along the curved scan paths for conversion to a stream of output pixel values in a rectangular coordinate system with a constant distance in an x-direction between adjacent output pixels. A position in the rectangular coordinate system of an output pixel is determined, as is the difference between the position of the output pixel and the positions on the curved scan paths of associated input pixels. A value for the output pixel is then determined as a function of (1) the value of the associated input pixels and of (2) the determined difference between the position of the output pixel and the positions of the associated input pixels.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
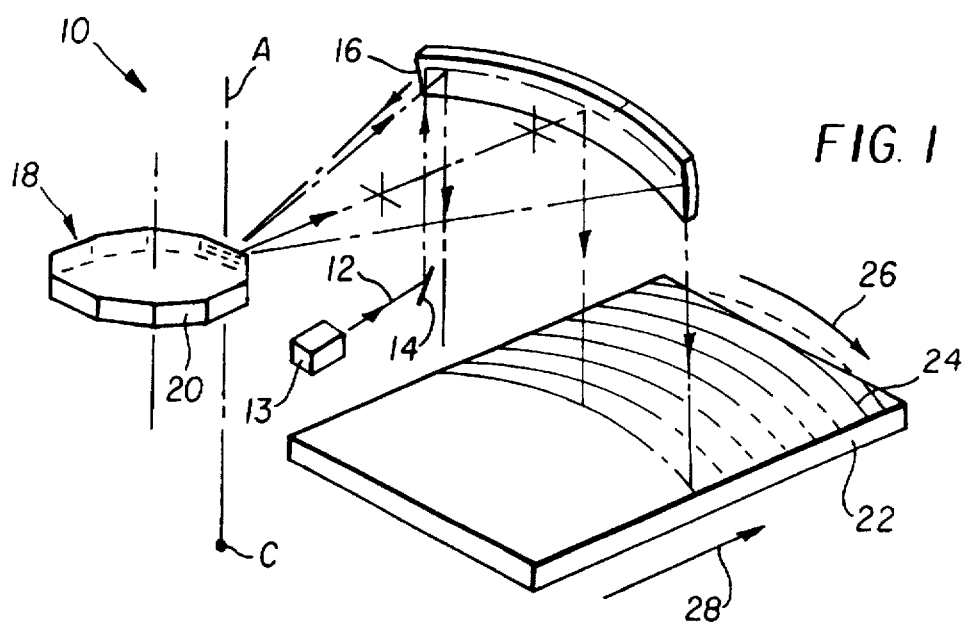
FIG. 1 is a perspective view of the scanner of the present invention.
Figure 2:
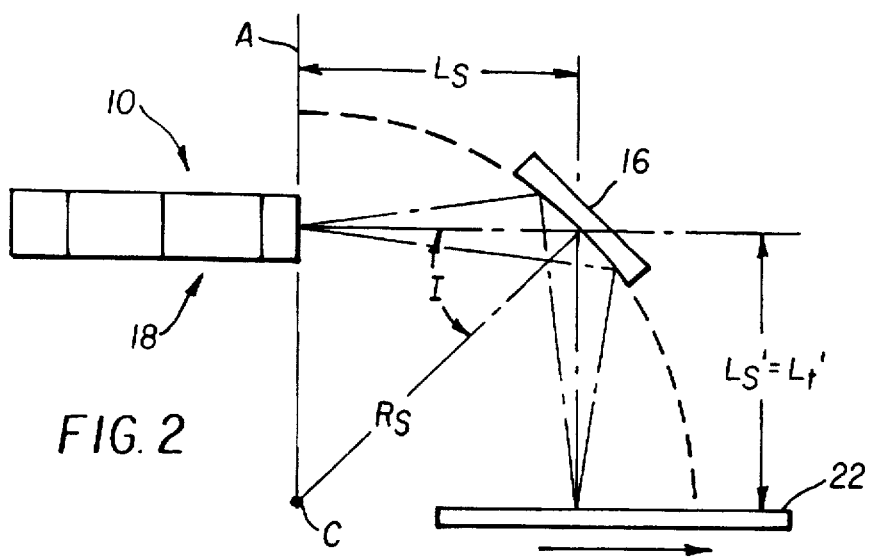
FIG. 2 is an elevational view showing the sagittal plane of the scanner.
Figure 3:
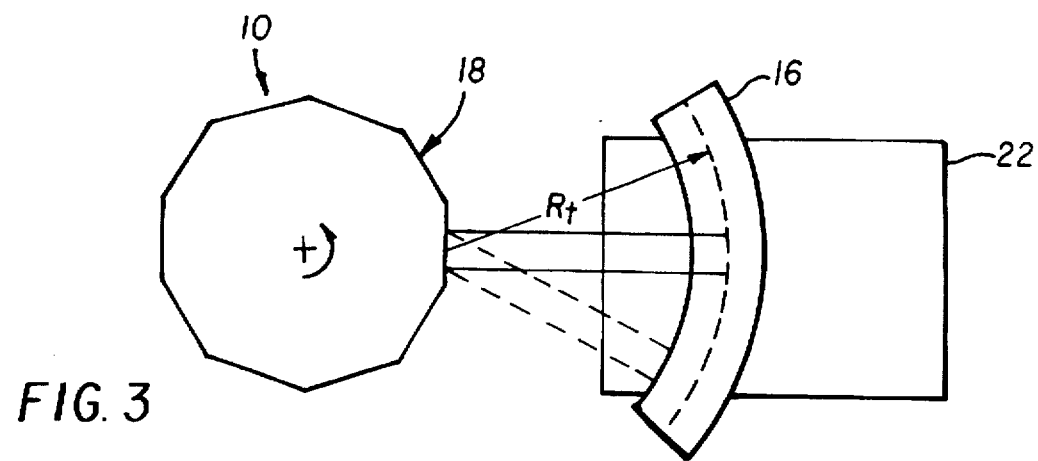
FIG. 3 is a plan view showing the tangential plane of the scanner.

With reference to FIG. 1, there is shown an optical scanner 10 constructed in accordance with the invention. A coherent light beam 12 from a light source 13 is directed by a mirror 14 to a spherical mirror 16. Light source 13 can be a conventional laser and can be modulated by an acousto-optic modulator (not shown) in a known manner. As shown in FIG. 2, mirror 16 has a radius of curvature $R_s$ which extends from a point C on an axis of symmetry A, and as shown in FIGS. 2 and 3, mirror 16 is monocentric with the axis of symmetry A. Mirror 16 directs beam 12 to a rotatable polygon 18 having a plurality of facets 20. The mirror 16 serves as an optical means to anamorphically shape the beam directed to polygon 18. As shown in FIG. 1, the beam 12 from mirror 16 to polygon 18 is located at a relatively large off-axis angle so as to induce astigmatism.

Polygon 18 serves as a deflector means for moving beam 12 through a predetermined scan angle. The polygon 18 directs the beam 12 back to a spherical mirror 16 which in turn directs the beam onto a receiving medium 22 where scan lines 24 are formed. The scan direction of beam 12 is indicated by arrow 26, and the cross-scan direction is indicated by arrow 28. Preferably, the polygon 18 is driven at a constant angular velocity by a motor (not shown).

The receiving medium 22 can be a photosensitive member, for example, a photographic film, a photographic paper, a photoconductor used in a copier-duplicator, or any other means responsive to a source of light to produce an output image. The receiving member 22 is driven in the cross-scan direction by suitable means (not shown). It will be understood that the beam 12 is line scanned at a much higher speed than the speed of the recording medium. The light beam 12 need not be monochromatic; it can also be polychromatic if it is desired to produce colored prints. The operation of polygons, lasers, optics, and modulators are well understood in the art. For a more complete description of their operations, see Urback et al, "Laser Scanning for Electronic Printing," Proceedings of the IEEE, 597 (June, 1982).

Figure 4:
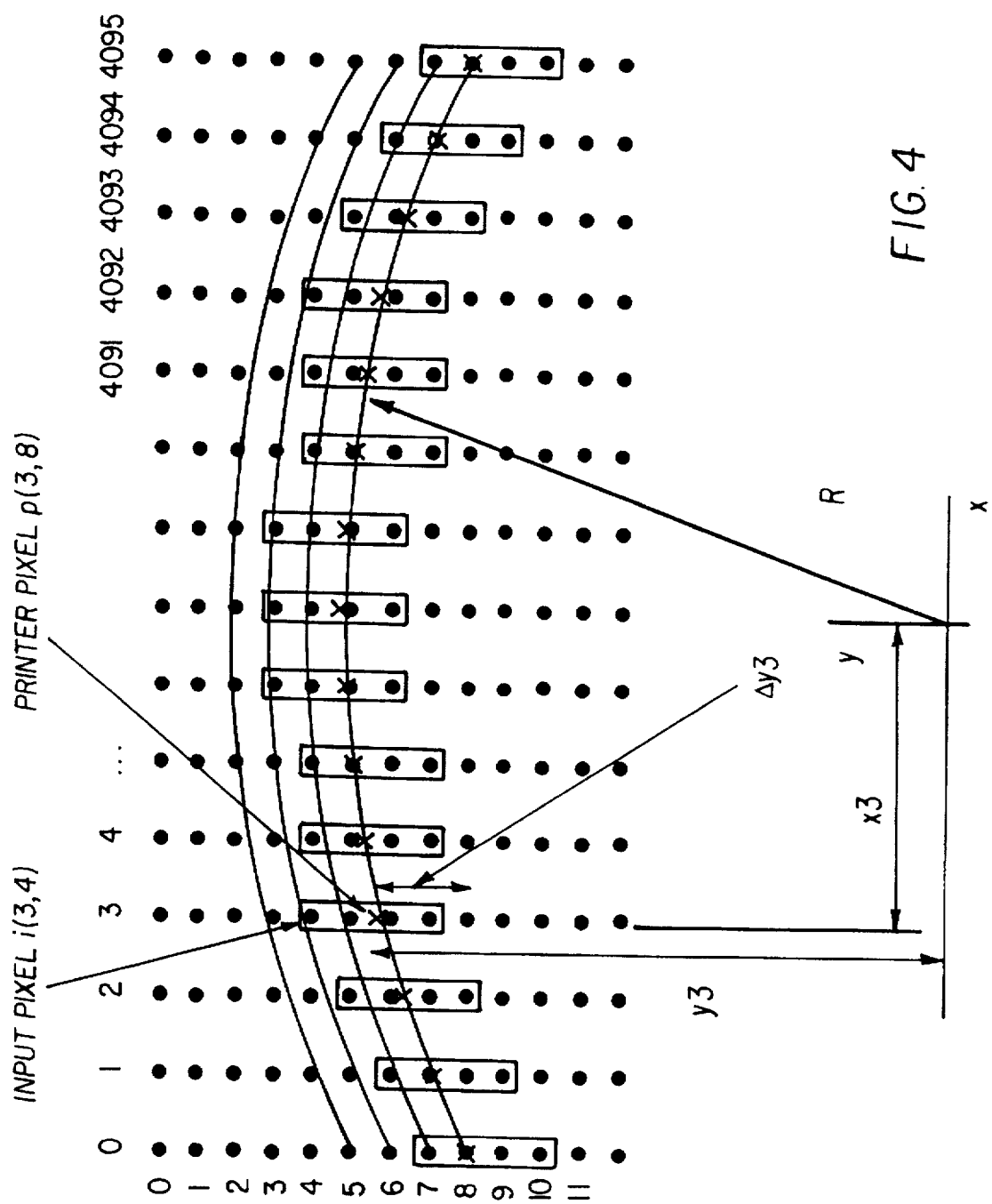
FIG. 4 graphically shows a one-dimensional process for correcting for curved scan lines in an output writer scanning system according to the present invention.
Figure 5:
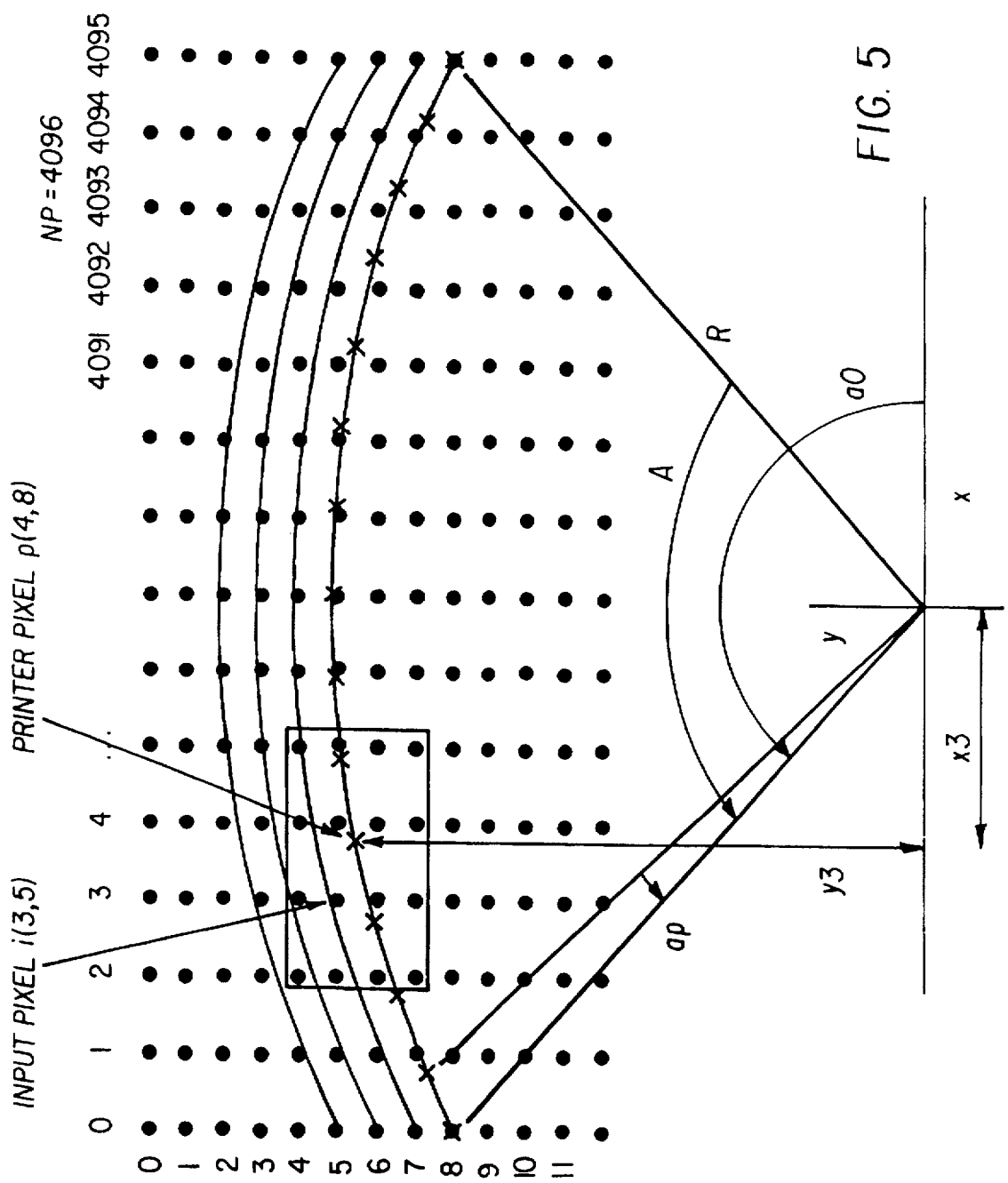
FIG. 5 graphically shows a two-dimensional process for correcting for curved scan lines in an output writer scanning system according to the present invention.

FIGS. 4 and 5 illustrate the invention as applied to a scanning system in a printer. Assuming an input digital image which has been sampled at the locations shown by the dots (·'s) in FIGS. 4 and 5, the process involves determining the positions of the printer pixels as shown by the x's on the curved scan lines, identifying the input pixels which surround each printer pixel x, and determining the values of each printer pixel as the weighted average of the surrounding input pixels. The particular weights or coefficients are chosen based on the distance between the printer pixel and the input pixel grid. In other words, the input digital image is "resampled" at the printer pixel positions along each scan arc.

Two different processes will be described, a one-dimensional and a two-dimensional process. These processes are described in the context of creating a digital image suitable for printing, though it is understood that a similar process can be used to create a digital image on rectangular coordinates from a starting digital image sampled on curved lines.

In the discussion that follows, the terms "input digital image" and "input pixels" refer to the original digital image which is sampled on a rectangular grid. The terms "printer digital image" and "printer pixels" refer to the process output which is suitable for sending to the optical system to create a print.

FIG. 4 demonstrates the one-dimensional process, so named because this process assumes that the horizontal distance between consecutive printer pixels along the scan arc is constant, and thus only the input pixels that fall in the same "column" as the printer pixel are used to compute the printer pixel value. The two-dimensional process assumes that the printer uses a fixed-frequency oscillator as the pixel clock, and thus assumes that the distance along the arc is constant between consecutive printer pixels. As illustrated in FIG. 5, the printer pixel locations in this case are between the input pixels in both the horizontal and vertical dimensions. Thus, the two-dimensional process computes each printer pixel value as a weighted average of a two-dimensional region of surrounding input pixels, rather than only those input pixels in the same column.

As shown in FIG. 4, the one-dimensional process involves resampling the input digital image at the positions where the printer will put its pixels. To do this, the first and last pixels of the printer scan arc are fixed to the same position as the first and last pixels of the corresponding input scan line. The radius of the scan arc and the number of pixels in the scan direction are constants. To designate pixel coordinates, i(m, n) will be used for input pixels, and p(m,n) will be used for printer pixels, where "m" represents pixel number across the scan, or column number, and "n" represents the arc or line number. Using the convention that the center of the arc is at the center of a rectangular coordinate system, the position within this coordinate system of the first printer pixel, p(0,0), can be computed by using the equation for a circle $x^2+y^2=R^2$. Thus, the position of pixel p(0,0) is:

$$x_0 = -NP/2$$
$$y_0 = SQRT(R^2 - x_0^2)$$

where:

NP=Number of pixels per scan line (or arc), and
R=Radius of scan arc in units of pixels The position of each successive pixel across scan arc 0 can then be determined by adding one (1) to the horizontal position and calculating the vertical position using the equation of a circle. For example, the position of printer pixel number N of arc 0, or p(N,0), is:

$$x_N = x_0 + N,$$
$$y_N = SQRT(R^2 - x_N^2)$$
$$= SQRT(R^2 - (x_0 + N)^2)$$

where N ranges from 0 to last pixel, number NP-1

Using these coordinates for printer pixel N, one must next determine which input pixels surround this printer pixel, as well as exactly how close is the printer pixel to the input grid. To do this, the difference in vertical position between pixel 0 and pixel N of the scan arc is determined. This difference will be called the vertical position delta for pixel N, or $\Delta y_N$, where:

$$\Delta y_N = y_N - y_0$$

$\Delta y_N$ in general is non-integer and has an integer and a fractional part. The integer part is used to determine which input pixels surround printer pixel N. To illustrate this, suppose we are computing printer pixel p(3,8) and suppose further that the equations above result in a vertical position delta $\Delta y_3 = 2.18$ pixels. Referring to FIG. 4, this means that pixel 3 of arc number 8 is between 2 and 3 pixels above line number 8 of the input image, or between input line 6 (8−2) and 5 (8−3) of the input digital image. The fractional part of $\Delta y_3$, 0.18, indicates that pixel p(3,8) is 0.18 pixels above input line 6, and 1−0.18=0.82 pixels below input line 5.

Figure 6:
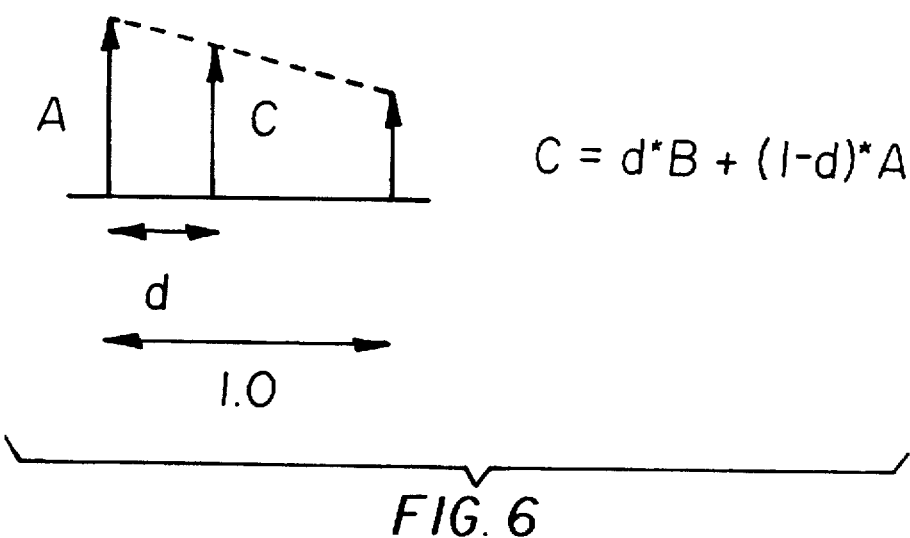
FIGS. 6 and 7 show interpolation methods useful with the present invention.

Finally, knowing the surrounding input pixel values and the fractional part of the vertical position delta, the printer pixel value is determined as the weighted average of these surrounding input pixel values using well-known interpolation methods. Two common interpolation methods are linear and cubic interpolation. It is well known that linear interpolation uses the two surrounding input pixels to perform each calculation, and that the weight to multiply each value is simply determined from its distance to each input pixel, as demonstrated in FIG. 6.

For the illustrated example, linear interpolation would determine the value of printer pixel p(3,8) from the two surrounding input pixels as:

$$p(3,8)=0.18*i(3,5)+0.82*i(3,6)$$

Similarly, for using the cubic interpolation method, cubic interpolation weights or coefficients can be determined from the fractional part of $\Delta y_N$ as shown in the references. Cubic interpolation coefficients are applied to the four surrounding input pixels, i(3,4) through i(3,7), to determine printer pixel p(3,8). This general process to correct for curved scan lines is not limited to linear and cubic interpolation methods, and can be easily extended to use other interpolation or filter coefficients.

The two-dimensional process will now be described with reference to FIG. 5. The primary difference between this method and the one-dimensional process is that consecutive printer pixels along the scan arcs do not fall in line with the columns of the input digital image. Thus, the two-dimensional process involves determining both a horizontal position and the vertical position for each printer pixel along the scan path.

As previously stated, with a fixed-frequency pixel clock, the positions of the printer pixels occur at regular intervals around the scan arc. In other words, the angles between pixels is constant. To determine the relative position between the printer pixels and the input pixels, a polar to rectangular coordinate conversion is done as shown below, where angles are expressed in radians.

NP=Number of pixels per scan line (or arc).

R=Radius of scan arc in units of pixels.

A=Angle traversed by entire scan arc, ap=Angle traversed between pixels=A/NP.

The angle $a_0$ of pixel p(0,0) from the horizontal axis is expressed:

$$a_0 = (A/2) + PI/2$$

Now, the positions of printer pixel p(0,0) can be converted to the rectangular coordinates of the input image as:

$$x_0 = R \cos(a_0),$$

and $$y_0 = R \sin(a_0)$$

The position of each successive pixel across the scan arc can then be determined by adding the angular offset, ap, to $a_0$ and repeating the polar to rectangular conversion.

The position of pixel p(N,0), where N ranges from 0 to the last pixel (number NP–1), is:

$$x_N = R \cos(a_0 + N*ap),$$

and $$y_0 = R \sin(a_0 + N*ap)$$

As in the one-dimensional case, the coordinates for printer pixel N are then used to determine which input pixels surround this printer pixel, as well as exactly how close is the printer pixel to the input grid. To do this, the difference in vertical and horizontal positions between pixel 0 and pixel N of the scan arc are determined. This difference is referred to as the vertical and horizontal position delta for pixel N, or $\Delta y_N$ and $\Delta x_N$, where:

$$\Delta y_N = y_N - y_0$$

$$\Delta x_N = x_N - x_0$$

$\Delta x_N$ and $\Delta y_N$ in general are non-integer and have an integer and a fractional part. The integer part is used to determine which input pixels surround printer pixel N. To illustrate this, suppose one is obtaining printer pixel p(4,8) and also suppose that the equations above result in a vertical position delta $\Delta y_4 = 2.72$ pixels and a horizontal position delta of $\Delta x_4 = 3.83$ pixels. Referring to FIG. 5, this means that pixel 4 of arc number 8 is horizontally positioned between columns 3 and 4 of the input image and vertically positioned between rows 6(8–2) and 5 (8–3) of the input image.

Figure 7:
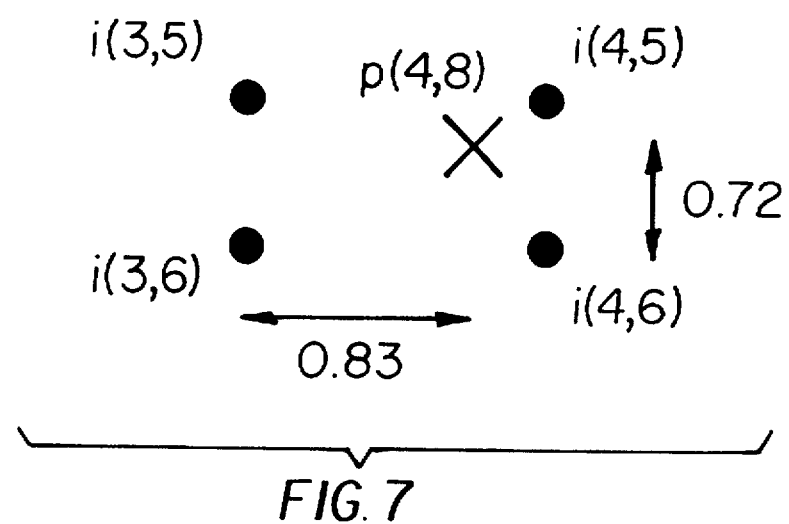

Finally, knowing the surrounding input pixel values and the fractional part of the vertical position delta, the printer pixel value is determined as the weighted average of these surrounding input pixel values using well-known interpolation methods. Two common interpolation methods are bilinear and bicubic interpolation. Since it is simpler to illustrate, bilinear, which uses the surrounding 2×2 pixel neighborhood is demonstrated for this example in FIG. 7.

Thus using well-known bilinear interpolation, the value of printer pixel p(4,8) is determined from this 2×2 region of the input image as:

$$p(4,8) = 0.72*[0.83*i(4,6)+0.17*i(3,6)] + 0.28*[0.83*i(4,5)+0.17*i(3,5)]$$

Similarly, for using the bicubic interpolation method, cubic interpolation weights or coefficients can be determined from the fractional parts of $\Delta y_N$ and $\Delta x_N$ as shown in the references. Cubic interpolation coefficients are applied to the surrounding 4×4 neighborhood of input pixels, i(2,4) through i(5,7), to determine printer pixel p(4,8). This general procedure for processing an image to correct for curved scan lines is not limited to bilinear and bicubic interpolation methods, and can be easily extended to use other interpolation or filter coefficients.

In the case of a scanning system for creating digital images, the inverse operation is required. That is, since the optical system measures the intensity of each pixel along each scan arc, creation of the output digital image entails "resampling" the scanner image at positions corresponding to a rectangular coordinate grid.

Figure 8:
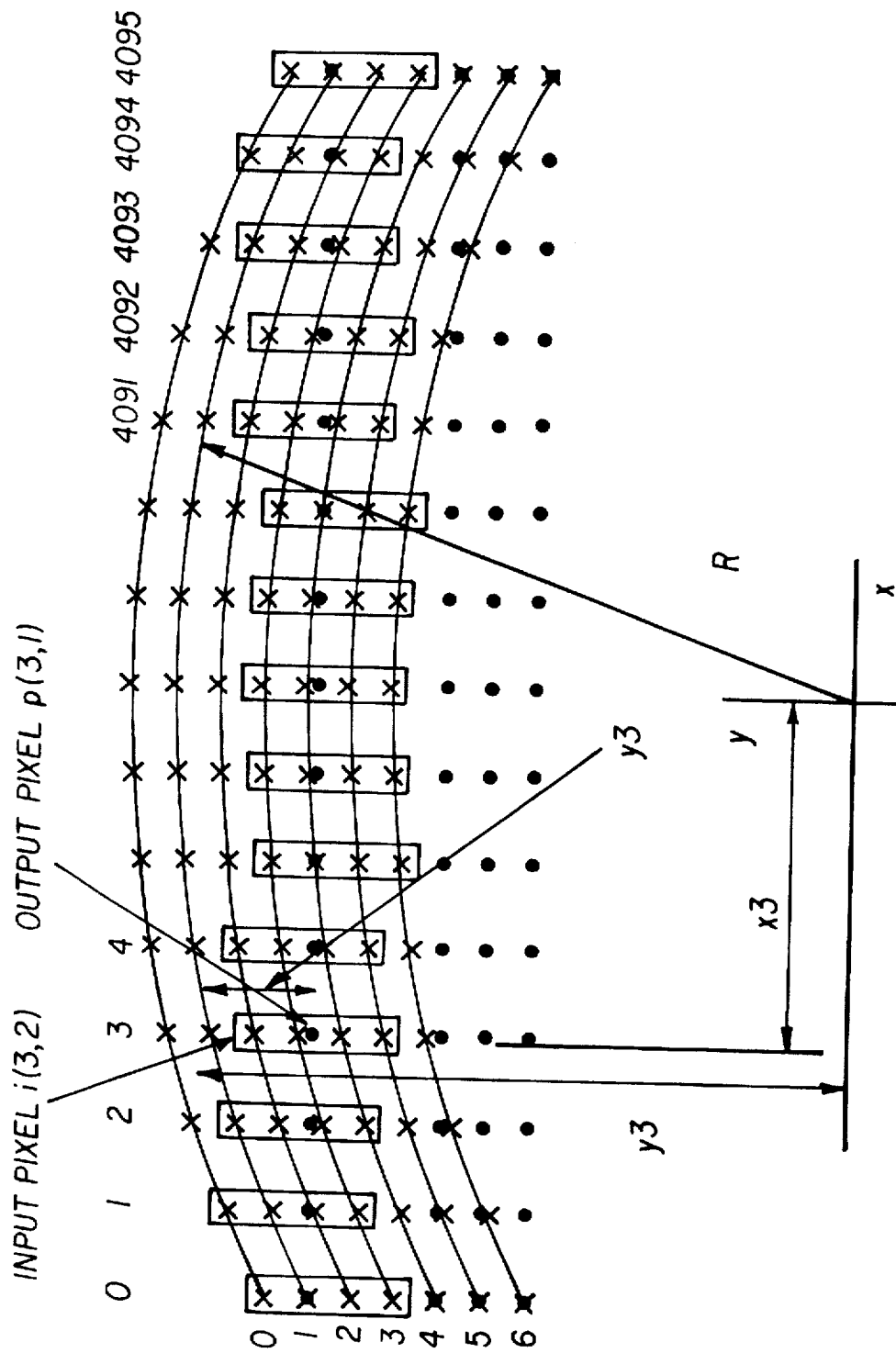
FIG. 8 graphically shows a one-dimensional process for correcting for curved scan lines in an input reader scanning system according to the present invention.

FIG. 8 illustrates the invention as applied to a scanning system in an input reader. Assuming an input digital image which has been sampled at the locations shown by the x's in FIG. 8, the process involves determining the positions of the output pixels as shown by the dots (·'s) on the output lines, identifying the input pixels which surround each output pixel dots (·'s), and determining the values of each output pixel as the weighted average of the surrounding input pixels. The particular weights or coefficients are chosen based on the distance between the printer pixel and the input pixel grid. In other words, the input digital image is "resampled" at the output pixel locations along each scan line.

A one-dimensional process will be described, although it will be understood that a two-dimensional process can be effected within the scope of the present invention.

In the discussion that follows, the terms "input digital image" and "input pixels" refer to the original digital image which is sampled on a curved grid. The terms "output digital image" and "output pixels" refer to the process output which is suitable for any application expecting a rectangularly-sampled digital image.

FIG. 8 demonstrates the one-dimensional process, so named because this process assumes that the horizontal distance between consecutive output pixels along the scan line is constant, and thus only the input pixels that fall in the same "column" as the output pixel are used to compute the output pixel value.

The one-dimensional process involves resampling the input digital image at the output pixel locations on a rectangular coordinate grid. To do this, the first and last pixels of the output scan line are fixed to the same position as the first and last pixels of the corresponding input scan arc. The radius of the scan arc and the number of pixels in the scan direction are constants. To designate pixel coordinates, i(m, n) will be used for input pixels, and p(m,n) will be used for output pixels, where "m" represents pixel number across the scan, or column number, and "n" represents the arc or line number. Using the convention that the center of the arc is at the center of a rectangular coordinate system, the position within this coordinate system of the first printer pixel, p(0,0), can be computed by using the equation for a circle $x^2+y^2=R^2$. Thus, the position of pixel p(0,0) is:

$$x_0 = -NP/2$$

$$y_0 = SQRT(R^2 - x_0^2)$$

where:

NP=Number of pixels per scan line (or arc), and

R=Radius of scan arc in units of pixels

The position of each successive pixel across scan line 1 can then be determined by adding one (1) to the horizontal position and calculating the vertical position using the equation of a circle. For example, the position of output pixel number N of line 1, or p(N,1), is:

$$x_N = x_0 + N,$$
$$y_N = SQRT(R^2 - x_N^2)$$
$$= SQRT(R^2 - (x_0 + N)^2)$$

where N ranges from 0 to last pixel, number NP−1

Using these coordinates for output pixel N, one must next determine which input pixels surround this output pixel, as well as exactly how close is the output pixel to the input grid. To do this, the difference in vertical position between pixel 0 and pixel N of the scan line is determined. This difference will be called the vertical position delta for pixel N, or $\Delta y_N$, where:

$$\Delta y_N = y_N - y_0$$

$\Delta y_N$ in general is non-integer and has an integer and a fractional part. The integer part is used to determine which input pixels surround output pixel N. To illustrate this, suppose we are computing output pixel p(3,1) and suppose further that the equations above result in a vertical position delta $\Delta y_3=2.18$ pixels. Referring to FIG. 8, this means that pixel 3 of line number 1 is between 2 and 3 pixels below arc number 1 of the input image, or between input arc 3 (1+2) and 4 (1+3) of the input digital image. The fractional part of $\Delta y_3$, 0.18, indicates that pixel p(3,1) is 0.18 pixels below input arc 3, and 1−0.18=0.82 pixels above input arc 4.

Finally, knowing the surrounding input pixel values and the fractional part of the vertical position delta, the output pixel value is determined as the weighted average of these surrounding input pixel values using well-known interpolation methods. Two common interpolation methods are linear and cubic interpolation. It is well known that linear interpolation uses the two surrounding input pixels to perform each calculation, and that the weight to multiply each value is simply determined from its distance to each input pixel, as demonstrated in FIG. 6.

For the illustrated example, linear interpolation would determine the value of output pixel p(3,1) from the two surrounding input pixels as:

$$p(3,1) = 0.18 * i(3,4) + 0.82 * i(3,3)$$

Similarly, for using the cubic interpolation method, cubic interpolation weights or coefficients can be determined from the fractional part of $\Delta y_N$ as shown in the references. Cubic interpolation coefficients are applied to the four surrounding input pixels, i(3,2) through i(3,5), to determine output pixel p(3,1). This general process to correct for curved scan lines is not limited to linear and cubic interpolation methods, and can be easily extended to use other interpolation or filter coefficients.

Advantages

This process can be embedded in a scanning system to automatically correct for the curved scan lines inherent to the optical system, producing an image free from the distortion that would be present in such a system without some sort of correction.

This process enables a printer to print any digital image rather than only images captured from a device which exactly matches the scan line characteristics of the printer. Similarly, this process allows a scanner to produce digital images that have rectangular coordinates and can be immediately displayed or manipulated using standard equipment.

A conventional resampling method is called "nearest-neighbor" resampling, in which the values of the nearest input pixel is assigned to each output pixel. The process according to the present invention provides superior image quality compared to the "nearest-neighbor" method.

An advantage of the two-dimensional process is that it more accurately determines the pixel positions for a system which uses a fixed-frequency pixel clock.

The invention has been described in detail with particular reference to preferred embodiments thereof, but it will be understood that variations and modifications can be effected within the spirit and scope of the invention.

What is claimed is:

1. A process for producing an image along curved scan paths from a source of input image pixel value data with pixels located in a rectangular coordinate system with a constant distance in an x-direction between adjacent input pixels, said process comprising the steps of:

determining a position along the curved scan paths of a pixel to be printed;

determining the difference between the position of the pixel to be printed and the positions in the rectangular coordinate system of associated input pixels; and determining a value for the pixel to be printed as a function of (1) the value data of the associated input pixels and of (2) the determined difference between the position of the pixel to be printed and the positions of the associated input pixels.

2. A process as set forth in claim 1, wherein the pixels to be printed are positioned along the curved scan paths with an x-direction distance between adjacent pixels equal to the x-direction distance between adjacent input pixels in the rectangular coordinate system.

3. A process as set forth in claim 1, wherein the value for the pixel to be printed is determined by weighting the value data of the associated input pixels as a function of the proximity of the associated input pixels to the pixel to be printed.

4. A process as set forth in claim 1, wherein the pixels to be printed are positioned along the curved scan paths with a constant arc length along the curved scan paths between adjacent pixels.

5. A process as set forth in claim 4, wherein the input pixels associated with the pixel to be printed are located in a two-dimensional region surrounding the pixel to be printed.

6. A process for reading an image in a rectangular coordinate system with a constant distance in an x-direction between adjacent input pixels with a scanner and optics that reads along curved scan paths, said process comprising the steps of:

determining a position in the rectangular coordinate system of an output pixel;

determining the difference between the position of the output pixel and the positions on the curved scan paths of associated input pixels; and determining a value for the output pixel as a function of (1) the value of the associated input pixels and of (2) the determined difference between the position of the output pixel and the positions of the associated input pixels.

7. A process as set forth in claim 6, wherein the input pixels have an x-direction distance between adjacent input pixels equal to the x-direction distance between adjacent output pixels in the rectangular coordinate system.

8. A process as set forth in claim 7, wherein the input pixels associated with the output pixel are aligned with the output pixel in a y-direction that is orthogonal to the x-direction.

9. A process as set forth in claim 6, wherein the value for the output pixel is determined by weighting the value data of the associated input pixels as a function of the proximity of the associated input pixels to the output pixel.

10. A process as set forth in claim 6, wherein the stream of input pixel values are created at a constant arc length along the curved scan paths between adjacent pixel values.

11. A process as set forth in claim 10, wherein the input pixels associated with the output pixel are located in a two-dimensional region surrounding the output pixel.

12. An output writer comprising:

an output scanner and optics that creates printed pixels along curved scan paths;

a source of input image pixel value data with pixels to be positioned in a rectangular coordinate system with a constant distance in an x-direction between adjacent input pixels;

means for determining a position along the curved scan paths of a pixel to be printed;

means for determining the difference between the position of the pixel to be printed and the positions in the rectangular coordinate system of associated input pixels; and means for determining a value for the pixel to be printed as a function of (1) the value data of the associated input pixels and of (2) the determined difference between the position of the pixel to be printed and the positions of the associated input pixels.

13. An output writer as set forth in claim 12, wherein the output scanner and optics creates printed pixels with an x-direction distance between adjacent pixels equal to the x-direction distance between adjacent input pixels in the rectangular coordinate system.

14. An output writer as set forth in claim 13, wherein the input pixels associated with the pixel to be printed are aligned with the input pixel in a y-direction that is orthogonal to the x-direction.

15. An output writer as set forth in claim 12, wherein the means for determining a value for the pixel to be printed weights the value data of the associated input pixels as a function of the proximity of the associated input pixels to the pixel to be printed.

16. An output writer as set forth in claim 12, wherein the output scanner and optics creates printed pixels with a constant arc length along the curved scan paths between adjacent pixels.

17. An output writer as set forth in claim 16, wherein the input pixels associated with the pixel to be printed are located in a two-dimensional region surrounding the pixel to be printed.

18. An input reader comprising:

an input scanner and optics that creates curved scan paths to produce a stream of input pixel values along the curved scan paths for conversion to a stream of output pixel values in a rectangular coordinate system with a constant distance in an x-direction between adjacent output pixels;

means for determining a position in the rectangular coordinate system of an output pixel;

means for determining the difference between the position of the output pixel and the positions on the curved scan paths of associated input pixels; and means for determining a value for the output pixel as a function of (1) the value of the associated input pixels and of (2) the determined difference between the position of the output pixel and the positions of the associated input pixels.

19. An input reader as set forth in claim 18, wherein the input pixels have an x-direction distance between adjacent input pixels equal to the x-direction distance between adjacent output pixels in the rectangular coordinate system.

20. An input reader as set forth in claim 19, wherein the input pixels associated with the output pixel are aligned with the output pixel in a y-direction that is orthogonal to the x-direction.

21. An input reader as set forth in claim 18, wherein the means for determining a value for the output pixel weights the value data of the associated input pixels as a function of the proximity of the associated input pixels to the output pixel.

22. An input reader as set forth in claim 18, wherein the input scanner and optics creates a stream of input pixel values at a constant arc length along the curved scan paths between adjacent pixel values.

23. An input reader as set forth in claim 22, wherein the input pixels associated with the output pixel are located in a two-dimensional region surrounding the output pixel.

* * * * *

UNITED STATES PATENT AND TRADEMARK OFFICE
CERTIFICATE OF CORRECTION

PATENT NO. : 5,777,751
DATED : July 7, 1998
INVENTOR(S) : Ward

It is certified that error appears in the above-identified patent and that said Letters Patent is hereby corrected as shown below:

Title page, insert the following item:

--[60] Provisional application No. 60/004,434 Sept. 28, 1995--

Column 1, line 3, insert the following:
--Correction Of Curved Scan Lines In An Optical Scanning System --
Reference is made to and priority claimed from U.S. Provisional Application Serial No. 60/004,434, filed Sept. 28, 1995, entitled Correction of Curved Scan Lines In An Optical Scanning System--.

Signed and Sealed this

Seventeenth Day of November, 1998

Attest:

BRUCE LEHMAN

*Attesting Officer*    *Commissioner of Patents and Trademarks*